(12) United States Patent
Ichikawa et al.

(10) Patent No.: US 7,142,894 B2
(45) Date of Patent: Nov. 28, 2006

(54) MOBILE PHONE FOR VOICE ADAPTATION IN SOCIALLY SENSITIVE ENVIRONMENT

(75) Inventors: Fumiko Ichikawa, Espoo (FI); Panu Korhonen, Helsinki (FI); Guy C. Nicholson, Teresa Ville (SG)

(73) Assignee: Nokia Corporation, Espoo (FI)

( * ) Notice: Subject to any disclaimer, the term of this patent is extended or adjusted under 35 U.S.C. 154(b) by 599 days.

(21) Appl. No.: 10/449,866

(22) Filed: May 30, 2003

(65) Prior Publication Data
US 2004/0242160 A1 Dec. 2, 2004

(51) Int. Cl.
*H04B 1/38* (2006.01)
*H04M 1/00* (2006.01)
(52) U.S. Cl. .............. 455/569.1; 455/556.1; 455/557; 379/406.01; 379/406.06
(58) Field of Classification Search ............. 455/569.1, 455/556.1, 557; 379/406.01, 406.06, 406.08
See application file for complete search history.

(56) References Cited

U.S. PATENT DOCUMENTS

| 5,220,287 A * | 6/1993 | Astridge ............... 330/132 |
| 6,205,217 B1 * | 3/2001 | Nobusawa ............ 379/395 |
| 6,834,107 B1 * | 12/2004 | Hurst ............. 379/390.01 |
| 6,941,161 B1 * | 9/2005 | Bobisuthi et al. ...... 455/569.1 |
| 2003/0143986 A1 * | 7/2003 | Mufti et al. .......... 455/414 |

* cited by examiner

*Primary Examiner*—Matthew D. Anderson
*Assistant Examiner*—Tuan Pham

(57) ABSTRACT

This invention describes a mobile phone with a means of measuring a background sound level of an environment. When a user either initiates or receives a phone call, sound levels before and during the call are compared. Once it is decided that the voice is too loud based on a predetermined criteria, the phone gives the user a feedback indicating that the voice is too loud and potentially a disruption to other people. Furthermore, the present invention provides a feedback for a voice adjustment by utilizing a sidetone adaptive signal that filters the user own speech directly to an earpiece.

27 Claims, 2 Drawing Sheets

MOBILE PHONE FOR VOICE ADAPTATION IN SOCIALLY SENSITIVE ENVIRONMENT

FIELD OF THE INVENTION

This invention generally relates to improving mobile phone etiquette and more specifically, to utilizing a means to detect the environment's sound level, adapt a mobile phone for operation in that environment and provide a feedback to a user if the voice level is inappropriate for the social environment the user is in.

BACKGROUND OF THE INVENTION

The primary function of a mobile phone is social: to enable the phone owner to communicate with other people. At the same time, though, using a mobile phone can be profoundly anti-social, especially to people in the immediate vicinity of a phone user. In restaurants, theatres and museums, on trains, or even standing in the supermarket checkout queue, there is no escape from chirping and bleeping phones, or from the sometimes seemingly inane conversations of their owners. Furthermore, in certain social settings, it is not appropriate to speak loudly when receiving or sending calls, for instance at a funeral, in a movie theatre, a business meeting, or a library. However, users do continue to allow their phones to ring audibly, and answer them. Often this behavior is not acceptable to other people in the vicinity. Mobile phone profiles are provided to allow users to set the phone to a mode such as "Meeting" or "Silent", where the ring will be attenuated or even silenced. However, having accepted a call, the user may converse normally (even loudly), thereby potentially offending other people in the vicinity.

Law enforcement and public campaigns can be effective when the user is ignorant of the anti-social consequences of the phone call. In reality, many people are already aware that a phone call in a public space can disturb others and in most cases they try to conform to a situation; the bigger problem is that the voice level increases due to other reasons, and the user is unaware of it. As the user tries to concentrate on the conversation with a person who does not share the same environment, the volume of his/her voice often becomes louder. It is particularly the case when the user is unfamiliar with electronics or has a sense of unreliability in mobile phones (as compared with fixed phones); they feel that their voice will be heard better if they speak loud. As a whole, such a consideration to "be heard on the other end" can be also cognitively demanding, as it takes so much attention from the user. The user can easily ignore the environment, environmental changes, and the surrounding people. For instance, the caller might not notice that the voice that was at an appropriate level on a station platform may be suddenly found too loud when stepping into a train compartment.

The issue is raised often in an urban society where people are densely populated and spending most of the time next to someone else, mostly strangers. In Japan, where both social etiquette and mobile phones are taken very seriously, train and metro companies make an announcement in compartments to turn the silent mode on. However, this type of solution is unenforceable and by far is not enough to solve the problem. More comprehensive solutions are described below.

Solution 1. Installation of a profile switcher: in Korea, the government performed trials for two kinds of devices that can be installed in places where silence is required: a device that blocks the network, and another device that changes the phone profile to silent mode automatically. The network-blocking device was found to be illegal, therefore, the profile-switching device will most likely be the device used. However, this solution is highly dependent on the infrastructure. It requires a device that automatically changes the profile to the corresponding mobile phones. If the user does not have a specified mobile phone or goes out from the range of the device, the situation cannot be fixed.

Solution 2. Social Mobiles (SoMo) Concept (IDEO): IDEO has designed a prototype "social mobile" which has the intent of modifying the user's behavior to make it less disruptive. The concept, called SoMo1, gives its user a mild electric shock, depending on how loud the person at the other end is speaking. This encourages both parties to speak more quietly; otherwise the mild tingling becomes an unpleasant jolt. Although the SoMo1 concept does consider the caller's voice level, it is only effective between callers on the phone. The concept does not consider how the other people around the caller find the voice level.

Solution 3. Mobile phone profiles are provided to allow users to set the phone to a mode such as "Meeting" or "Silent", where the ring will be attenuated or even silenced. However, having accepted a call, the user may converse normally (even loudly), thereby potentially offending other people in the vicinity.

None of the solutions described above are adequate. It is desirable to find an alternative solution, which will not require additional infrastructure and which will give the user a chance to notice their misbehavior by themselves before they are pointed out by a third party. Such a solution is disclosed in the present invention.

SUMMARY OF THE INVENTION

The object of the present invention is to provide a voice adaptation in mobile phones used in socially sensitive environment.

According to a first aspect of the present invention, a mobile phone comprises a sound level comparator, responsive to a background sound level signal having a magnitude indicative of a background sound level and to a voice sound level signal having a magnitude indicative of a voice sound level of a user of the mobile phone, for providing a voice level warning signal if the voice sound level in comparison with the background sound level based on a predetermined criteria is not acceptable; and a warning voice level means, responsive to the voice level warning signal, for providing a voice level warning perceptible to the user.

In further accord with the first aspect of the invention the voice level warning may be a visual warning, an audio warning, a tactile warning or any combination thereof.

Still according to the first aspect of the invention, the mobile phone further comprises a sound level meter, responsive to the background sound level and to the voice sound level of the user, for providing the background sound level signal and the voice sound level signal.

According still further to the first aspect of the invention, the sound level meter comprises a further microphone, for providing a background meter signal having a magnitude indicative of the background sound level and a voice sound signal having a magnitude indicative of the voice sound level of the user to the sound level meter.

Still further according to the first aspect of the invention, the mobile phone having the sound level meter, further comprises a microphone, for providing a background meter signal having a magnitude indicative of the background sound level and a voice sound signal having a magnitude indicative of the voice sound level of the user to the sound level meter.

Further still according to the first aspect of the invention, the mobile phone having the sound level meter, further comprises an amplifier, responsive to a microphone voice signal from the microphone, to a background sound level adjustment signal from the sound level comparator and to an amplifier adjustment signal, for providing a further electronic sound signal and a sidetone adaptive signal during a phone call.

In further accordance with the first aspect of the invention, the mobile phone having the amplifier, further comprises a sidetone amplifier, responsive to the sidetone adaptive signal, to a background sidetone adjustment signal from the sound level comparator and to a further voice adjustment on/off signal, for providing an amplified sidetone adaptive signal.

Yet further still according to the first aspect of the invention, the mobile phone having the sidetone amplifier, further comprises an earpiece, responsive to the amplified sidetone adaptive signal and to a voice signal from a further user received through a normal mobile phone communication channel, for providing a sidetone sound audio signal and a voice sound audio signal from the further user to the user.

According further to the first aspect of the invention, the mobile phone further comprises a sound profile switch, responsive to a sound profile command signal from the user, for providing an amplifier adjustment signal.

According still further to the first aspect of the invention, the mobile phone further comprises a sound profile switch, responsive to a sound profile command signal from the user, for providing an amplifier adjustment signal and a sidetone adjustment signal.

According yet further to the first aspect of the invention, the mobile phone having a sound profile switch, further comprises a ring adjustment means, responsive to the ring adjustment signal from the sound profile switch.

Further still according to the first aspect of the invention, the mobile phone further comprises a voice adjustment on/off switch, responsive to a voice adjustment on/off command signal, for providing a voice adjustment on/off signal to the sound level comparator and/or a further voice adjustment on/off signal to a sidetone amplifier.

Yet still further according to the first aspect of the invention, both the voice sound level signal and the background sound level signal are provided for a selected acoustic frequency range, said frequency range chosen for the best speech illegibility.

Still further according to the first aspect of the invention, the sound level comparator is responsive to the background sound level signal before the phone call and to the background sound level signal combined with the voice level signal during the phone call responded to or initiated by the user.

Yet further still according to the first aspect of the invention, the mobile phone further comprises a sound level meter, responsive to the background sound level before a phone call and to the background sound level combined with the voice sound level during the phone call, for providing the background sound level signal before the phone call and the background sound level signal combined with the voice sound level signal during the phone call.

According to a second aspect of the invention, a method for use in a mobile phone comprises the steps of: comparing a background sound level signal having a magnitude indicative of a background sound level and to a voice sound level signal having a magnitude indicative of a voice sound level of a user of the mobile phone and determining if the voice sound level is acceptable in comparison with the background sound level based on a predetermined criteria; and providing a voice level warning to the user if the comparison is not acceptable based on the predetermined criteria.

According further to the second aspect of the invention, the method further comprises the step of measuring the background sound level by the sound level meter and storing an average background sound level signal by a sound level comparator, said averaging is over the background sound level signal and a predetermined number of the previously measured background sound level signals.

Further according to the second aspect of the invention, the method further comprises the step of providing a background sound level adjustment signal to an amplifier and a background sidetone adjustment signal to a sidetone amplifier by the sound level comparator.

Still further according to the second aspect of the invention, the method further comprises the steps of: coupling a sidetone adaptive signal to an earpiece during the phone call; and providing a sidetone sound audio signal to the user.

Further still in accordance with the second aspect of the invention, the method further comprises the steps of: coupling a sidetone adaptive signal to an earpiece during the phone call; and providing a sidetone sound audio signal to the user by providing a sidetone adaptive signal to the earpiece from the amplifier through the sidetone amplifier.

BRIEF DESCRIPTION OF THE DRAWINGS

For a fuller understanding of the nature and objects of the present invention, reference is made to the following detailed description taken in conjunction with the following drawings, in which.

BEST MODE FOR CARRYING OUT THE INVENTION

The present invention utilizes a mobile phone enhanced with a means of checking a sound level of an environment, such as a sound level meter. The system periodically checks the sound level in the user's environment. When a user either initiates or receives a phone call, sound levels before and/or during the call are compared. Once the sound level meter detects the voice being too loud, the phone gives the user feedback indicating that the voice is too loud and potentially a disruption to the others. Furthermore, the present invention provides feedback for a user's voice adjustment by utilizing a sidetone adaptive signal that filters the user's own speech directly to an earpiece: if the sidetone is too loud, the user will speak more quietly, if it is too quiet, the user will speak more loudly.

Figure 1:
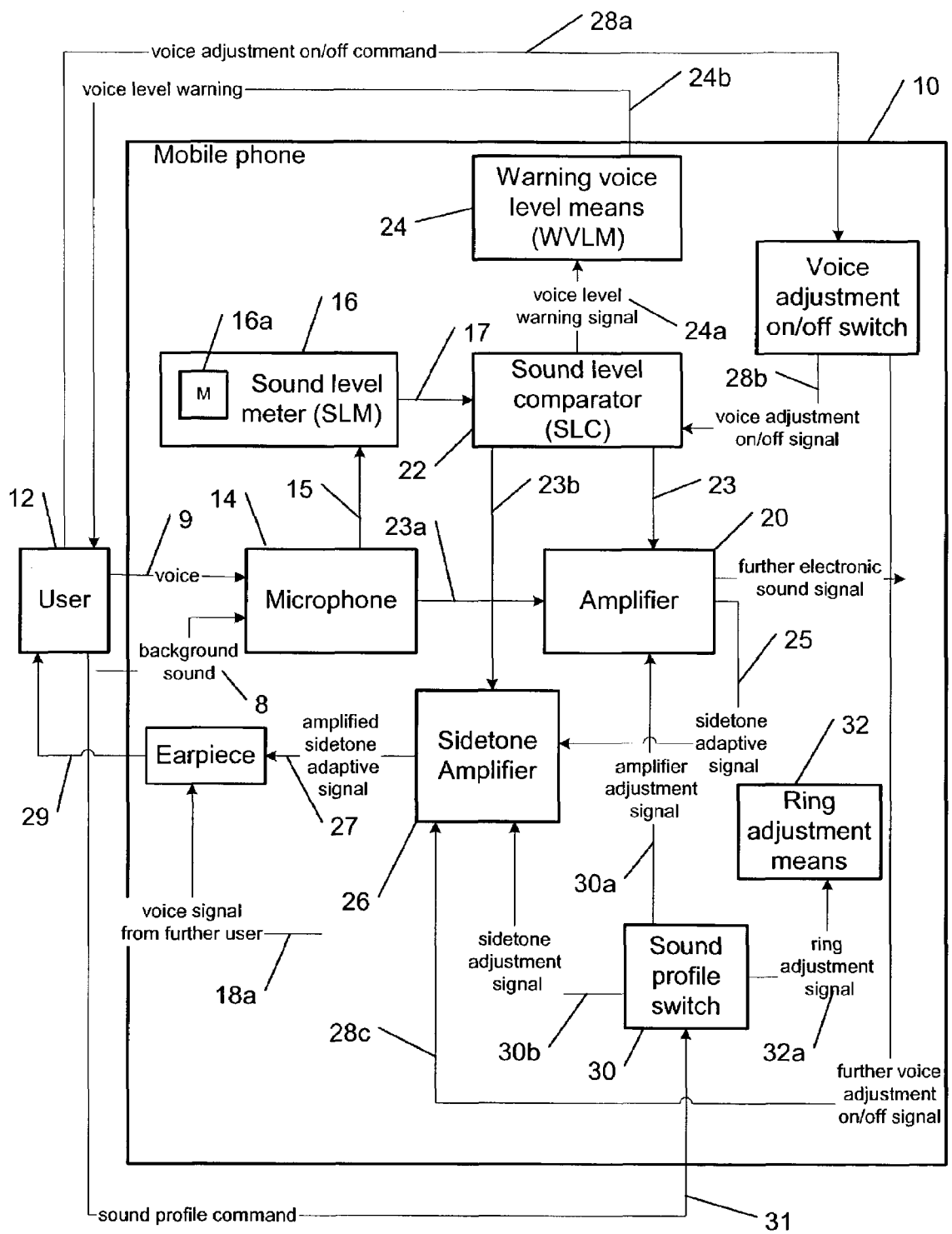
FIG. 1 is a block diagram representing major features of a mobile phone, according to the present invention.

FIG. 1 is a block diagram representing major features of a mobile phone 10, according to the present invention. A sound level meter (SLM) 16 measures a background sound level periodically with a predetermined time interval and a voice sound level during a phone call initiated or received by a user 12 of the mobile phone 10, providing a background sound level signal and a voice sound level signal on a line 17 to a sound level comparator 22. The sound level meter 16 can utilize a microphone 14 to provide an input signal on a line 15, i.e. a background meter signal having a magnitude indicative of the background sound level 8 and a voice sound meter signal having a magnitude indicative of a voice sound level 9 of the user 12, for generating the background sound level signal and the voice sound level signal and forwarding these signals on the line 17 to the sound level comparator 22. Alternatively, the sound level meter 16 can utilize an input signal from a further microphone 16a responsive to the background sound level and to the voice sound level of the user 12. It is preferred, according to the present invention, that if the further microphone 16a is used, then the distance between the further microphone 16a and an origin of a voice (e.g. user's mouth) should be approximately the same as the distance between the microphone 14 and the origin of the voice of the user 12. Preferably, both the voice sound level signal and the background sound level signal are provided for a selected acoustic frequency range, which should be chosen for the best speech intelligibility.

The sound level comparator 22 receives the background sound level signal (BSLS) on the line 17 from the sound level meter 16, calculates and stores the average BSLS based on the received BSLS and on a predetermined number of the previously received and stored BSLSs. According to the present invention, the BSLSs can be received by the sound level comparator 22 preferably before the phone call, which does not exclude other options, such as receiving BSLS during dialing or ringing or even during the call. After receiving the subsequent BSLS, the average BSLS stored in the sound level comparator 22 is updated. The sound level comparator 22 evaluates the BSLS using a predetermined background criteria and forwards a background sound level adjustment signal (BSLAS) on a line 23 to an amplifier 20 based on that evaluation. The BSLAS changes the gain of the amplifier 20, which processes a microphone voice signal provided on a line 23a by the microphone 14 having a magnitude indicative of a voice sound level originated by the user 12. Changing the gain of the amplifier 20 based on the background sound level is an important concept of this invention for providing a voice level adjustment: for example, by increasing the gain of the amplifier 20, the user 12, having a phone conversation with a further user through a normal mobile phone communication channel, can speak in a quiet voice and still be heard by the further user. Similarly, based on the predetermined background criteria, the sound level comparator 22 provides a background sidetone adjustment signal 23b to a sidetone amplifier 26, which is discussed in detail below.

During the phone call, the sound level comparator 22 receives a combined signal on the line 17 of the voice sound level signal (VSLS) and the BSLS from the sound level meter 16. The sound level comparator 22 evaluates if the voice sound level is acceptable in comparison with the background sound level based on a predetermined criteria. Various criteria for the comparison can be used by the sound level comparator 22. For example, the background portion of the combined VSLS and BSLS can be eliminated by subtracting the average BSLS stored in the sound level comparator 22 from the combined signal, and then comparing a resulting difference with the average BSLS using a predetermined criteria. If the criteria is not satisfied the sound level comparator 22 provides a voice level warning signal (VLWS) on a line 24a to a warning voice level means 24.

The warning voice level means 24 provides a voice level warning (VLW) signal on a line 24b perceptible to the user 12 based on the received VLWS. A type of the voice level warning signal can be audio, tactile, visual or any combination thereof. The VLW can contain qualitative information. For example, the VLW can be made in different levels, such as precaution (voice is increasing), warning (voice may be loud), and alert (voice is clearly too loud). The VLW can also contain quantitative information (e.g., voice is loud by a certain measurable amount). Audio feedback can be optimal as it can have direct feedback to the user's handset speaker.

Another important feature of the present invention is a method for providing feedback for subjectively adjusting the user voice level by utilizing a sidetone adaptive signal 25 that filters the user's own speech directly to an earpiece 18 during the phone call. The fundamental difference with prior art utilizing a sidetone signal is that the sidetone adaptive signal 25 is adjusted based on the background sound level 8 and a position of a sound profile switch 30 whereas prior art does not teach that adjustment feature. The adjustment can be implemented by providing the background sidetone adjustment signal 23b (as discussed above) and a sidetone adjustment signal 30b (as discussed below) to the sidetone amplifier 26. If the sidetone adaptive signal 25 is provided by the amplifier 20 as discussed below, a further adjustment of the sidetone adaptive signal 25 can be facilitated by providing the background amplifier adjustment signal 23 (as discussed above) and an amplifier adjustment signal 30a (as discussed below) to the amplifier 20. Thus, the overall concept is to couple the adaptive sidetone adaptive signal to the earpiece 18. This can be accomplished in a number of ways. One preferred way described here is to amplify a sidetone adaptive signal provided by the amplifier 20. The sidetone amplifier 26 amplifies the sidetone adaptive signal provided on a line 25 from the amplifier 20. The sidetone amplifier 26 amplifies the sidetone adaptive signal and forwards the amplified sidetone adaptive signal on a line 27 to the earpiece 18. The earpiece 18 provides both a sidetone sound audio signal (SSAS) and a voice sound audio signal (VSAS) from the further user on a line 29 to the user 12. The VSAS from the further user is generated by the earpiece 18 in response to a voice sound signal (VSS) from the further user during a phone call, said VSS is provided through a normal mobile phone communication channel. Then if the SSAS is too loud so that the user 12 hears his/her own voice excessively and/or it is too loud compared to the VSAS of the further user, the user 12 will speak more quietly, if the SSAS is too quite so that the user 12 cannot or can hardly hear his/her own voice and/or it is too quite compared to the VSAS of the further user, the user 12 will speak more loudly.

The important feature disclosed in the present invention is a gain adjustment of the sidetone amplifier 26 as a function of the background sound level using a background sidetone adjustment signal 23b from the sound level comparator 22, which is implemented using the same predetermined criteria as for the BSLAS on the line 23, described above. Changing the gain of the sidetone amplifier 26 based on the background sound level is an important concept of this invention for providing a sidetone adjustment: for example, increasing the gain of the amplifier 26 will make the sidetone adaptive signal perceptible by the user 12 louder. The sidetone adaptive level also can be changed by responding to an external signal. The application can be that the user 12 goes to an art gallery, where a local signal at the entrance and exit (such as Bluetooth or WLAN) can inform the phone to switch to a higher sidetone level on entering (e.g., by adjusting the gain of the amplifiers 26 and/or 20), and switch back on exiting. This switch can be implemented as a part of a sound profile switch 30, operation of which is described below in detail.

There are other important features shown in FIG. 1. These features include a voice adjustment on/off switch 28 and the sound profile switch. 30. The voice adjustment on/off switch 28 can be used to activate or deactivate the voice adjustment system described in this invention. For example, if the user is at home or somewhere private where there is no need to be concerned with the environment, the voice adjustment on/off switch 28 can be switched to an "off" position using a voice adjustment command signal on a line 28a from the user 12. This may be actuated by a mechanical switch, a voice, an icon, etc. Then the voice adjustment on/off switch 28 provides the voice adjustment off signal on a line 28b to the sound level comparator 22 and the further voice adjustment off signal on a line 28c to the sidetone amplifier 26. Another option is to deactivate only a sidetone feature (deactivate the sidetone amplifier 26), so the voice adjustment on/off switch 28 can have two "off" positions: one position deactivating only the sidetone feature, and the other position deactivating both features (deactivating the sound level comparator 22 and the sidetone amplifier 26).

Another important feature is associated with the sound profile switch 30. Depending on the environment, the user 12 can provide a sound profile command signal on a line 31 to adjust, activate or deactivate a number of parameters. One adjustment signal on a line 32a can be applied to a ring adjustment means 32 to control the sound level of the ring (e.g., adjust the amplitude, activate or deactivate). Other important adjustment signals on lines 30a and 30b can be used for setting the gain of the amplifier 20 and the gain of the sidetone amplifier 26, respectively, appropriate for a particular environment. For example, if the user 12 sets the phone to a "silent" mode, the system can assume that the user is in a place where one needs some consideration to the sound, and the gains of the amplifier 20 and the sidetone amplifier 26 are adjusted appropriately to facilitate more sensitive transmission, so that the user 12 can speak in a more quiet voice. The command signal on the line 31 may take a form of a multi-position switch mechanically actuated, it could be a voice or an icon command, or a continuous gain adjustment can be provided to the amplifiers 20 and 26 on the lines 30a and 30b, respectively, using, for example, a continuously adjusted potentiometer incorporated within the sound profile switch 30.

Figure 2:
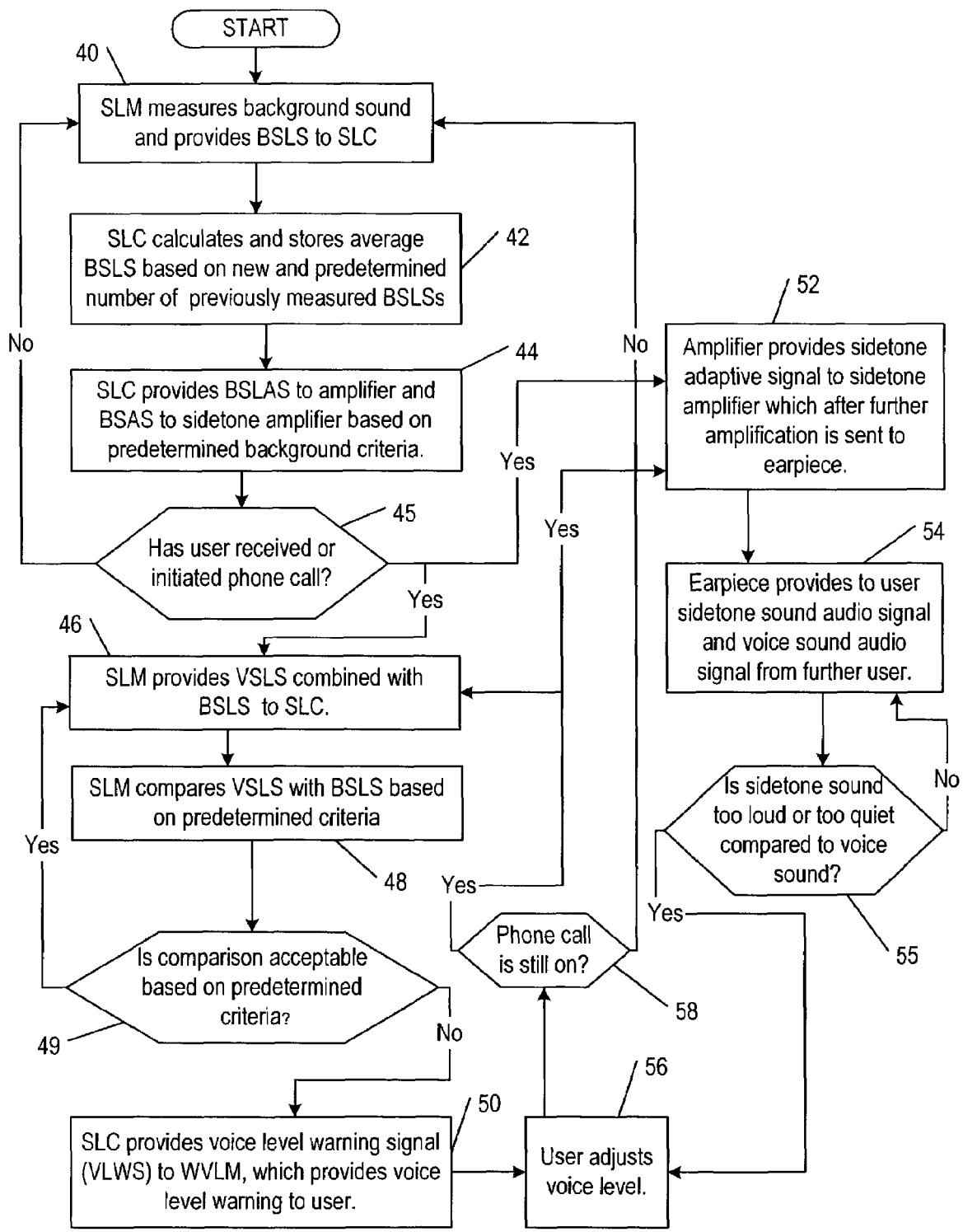
FIG. 2 is a flow chart illustrating mobile phone performance, according to the present invention.

FIG. 2 shows a flow chart illustrating a mobile phone performance. In a method according to the present invention, in one possible scenario, in a first step 40, the sound level meter (SLM) 16 (FIG. 1) measures the background sound and provides the background sound level signal (BSLS) to the sound level comparator (SLC) 22 (FIG. 1). In a next step 42, the sound level comparator 22 calculates and stores the average BSLS based on the received and predetermined number of the previously measured BSLSs. In a next step 44, the sound level comparator 22 provides the background sound level adjustment signal (BSLAS) to an amplifier 20 based on the predetermined background criteria. In a next step 45, it is ascertained whether the user 12 has received or initiated the phone call. As long as that is not the case, the process returns to step 40. If the user 12 has received or initiated a phone call, the process continues to steps 46 and 52, which initiate two sequences taking place in parallel. In a step 46, the sound level meter 16 provides VSLS combined with BSLS to the sound level comparator 24. In a next step 48, the sound level comparator 22 compares VSLS with BSLS based on the predetermined criteria. In a next step 49, it is ascertained whether the comparison performed in step 48 is acceptable. As long as that is the case, the process returns to step 46. Otherwise, in a next step 50, the sound level comparator 22 provides the voice level warning signal (VLWS) to the warning voice level means (WVLM) 24, which provides the voice level warning (VLW) to the user 12. In a next step 56, the user 12 adjusts the voice level based on the voice level warning. In a step 52, the amplifier 20 (FIG. 1) provides the sidetone adaptive signal to the sidetone amplifier 26 (FIG. 1), which is sent to the earpiece 18 after further amplification by the sidetone amplifier 26. In a next step 54, the earpiece 18 provides to the user 12 the sidetone sound and the voice sound from the further user. In a next step 55, it is ascertained whether the sidetone sound is too loud or too quiet. As long as that is not the case, the process returns to step 54. Otherwise, in a step 56, the user 12 adjusts his/her voice level. In a final step 58, it is ascertained whether the phone call is still on. As long as that is the case, the process returns to steps 46 and 52. Otherwise, the process returns to step 40. FIG. 2 illustrates one scenario among others, which can be used for implementing the present invention.

What is claimed is:

1. A mobile phone, comprising:
   a sound level comparator, responsive to a background sound level signal having a magnitude indicative of a background sound level and to a voice sound level signal having a magnitude indicative of a voice sound level, for providing a voice level warning signal if the voice sound level in comparison with the background sound level using a predetermined criterion is not acceptable; and
   a warning voice level module, responsive to the voice level warning signal, for providing a voice level warning, wherein said sound level comparator is further configured to provide a background sidetone adjustment signal to a sidetone amplifier for providing an amplified sidetone adaptive signal.

2. The mobile phone of claim 1, wherein the voice level warning is a visual warning.

3. The mobile phone of claim 1, wherein the voice level warning is an audio warning.

4. The mobile phone of claim 1, wherein the voice level warning is a tactile warning.

5. The mobile phone of claim 1, further comprising a sound level meter, responsive to the background sound level and to the voice sound level of the user, for providing the background sound level signal and the voice sound level signal.

6. The mobile phone of claim 5, wherein the sound level meter comprises a further microphone, configured to provide a background meter signal having a magnitude indicative of the background sound level and a voice sound signal having a magnitude indicative of the voice sound level to the sound level meter.

7. The mobile phone of claim 5, further comprising a microphone, for providing a background meter signal having a magnitude indicative of the background sound level and a voice sound signal having a magnitude indicative of the voice sound level to the sound level meter.

8. The mobile phone of claim 5, further comprising an amplifier, responsive to a microphone voice signal from the microphone, to a background sound level adjustment signal from the sound level comparator and to an amplifier adjustment signal, for providing a further electronic sound signal and a sidetone adaptive signal during a phone call.

9. The mobile phone of claim 8, further comprising a sidetone amplifier, responsive to the sidetone adaptive signal, to said background sidetone adjustment signal from the sound level comparator and to a further voice adjustment on/off signal, configured to provide an amplified sidetone adaptive signal.

10. The mobile phone of claim 9, further comprising an earpiece, responsive to the amplified sidetone adaptive signal and to a voice signal from a further device received through a normal mobile phone communication channel, for providing a sidetone sound audio signal and a voice sound audio signal from the further device.

11. The mobile phone of claim 1, further comprising a sound profile switch, responsive to a sound profile command signal, for providing an amplifier adjustment signal.

12. The mobile phone of claim 11, wherein the sound profile switch further configured to provide a sidetone adjustment signal.

13. The mobile phone of claim 11, further comprising a ring adjustment means, responsive to a ring adjustment signal from the sound profile switch.

14. The mobile phone of claim 1, further comprising a voice adjustment on/off switch, responsive to a voice adjustment on/off command signal, for providing a further voice adjustment on/off signal to a sidetone amplifier.

15. The mobile phone of claim 14, wherein the voice adjustment on/off switch further configured to provide a voice adjustment on/off signal to the sound level comparator.

16. The mobile phone of claim 1, wherein both the voice sound level signal and the background sound level signal are provided for a selected acoustic frequency range, said frequency range chosen for the best speech illegibility.

17. The mobile phone of claim 1, wherein the sound level comparator is responsive to the background sound level signal before a phone call and to the background sound level signal combined with the voice level signal during the phone call.

18. The mobile phone of claim 1, wherein the sound level comparator configured to provide a background sound level adjustment signal to an amplifier.

19. The mobile phone of claim 18, wherein the sound level comparator further configured to provide a background sidetone adjustment signal to a sidetone amplifier.

20. The mobile phone of claim 1, wherein the sound level comparator is responsive to a voice adjustment on/off signal from a voice adjustment on/off switch.

21. The mobile phone of claim 1, further comprising a sound level meter, responsive to the background sound level before a phone call and to the background sound level combined with the voice sound level during the phone call, for providing the background sound level signal before the phone call and the background sound level signal combined with the voice sound level signal during the phone call.

22. A method for use in a mobile phone, comprising:
comparing by a sound level comparator a background sound level signal having a magnitude indicative of a background sound level and to a voice sound level signal having a magnitude indicative of a voice sound level of the mobile phone and determining if the voice sound level is acceptable in comparison with the background sound level using a predetermined criterion;

providing a voice level warning if the comparison is not acceptable using the predetermined criterion; and providing by the sound level comparator a background sidetone adjustment signal to a sidetone amplifier for providing an amplified sidetone adaptive signal.

23. The method of claim 22, further comprising:
measuring the background sound level by the sound level meter and storing an average background sound level signal by a sound level comparator, said averaging is over the background sound level signal and a predetermined number of the previously measured background sound level signals.

24. The method of claim 22, further comprising:
providing a background sound level adjustment signal to an amplifier.

25. The method of claim 24, further comprising:
providing by said amplifier a sidetone adaptive signal to the sidetone amplifier during the phone call;

providing said amplified sidetone adaptive signal by said sidetone amplifier in response to said sidetone adaptive signal and to said background sidetone adjustment signal; and providing, by an earpiece in response to said amplified sidetone adaptive signal, a sidetone sound audio signal for providing said sidetone feedback.

26. A mobile phone, comprising:
means for comparing a background sound level signal having a magnitude indicative of a background sound level and to a voice sound level signal having a magnitude indicative of a voice sound level and determining if the voice sound level is acceptable in comparison with the background sound level using a predetermined criterion;

means for providing a voice level warning to the user if the comparison is not acceptable using the predetermined criterion; and means for providing a background sidetone adjustment signal to a sidetone amplifier for providing an amplified sidetone adaptive signal.

27. The mobile phone of claim 26,
wherein said means for comparing the background sound level and said means for providing the background sidetone adjustment signal are comprised in a sound level comparator.

* * * * *